Figure 1:
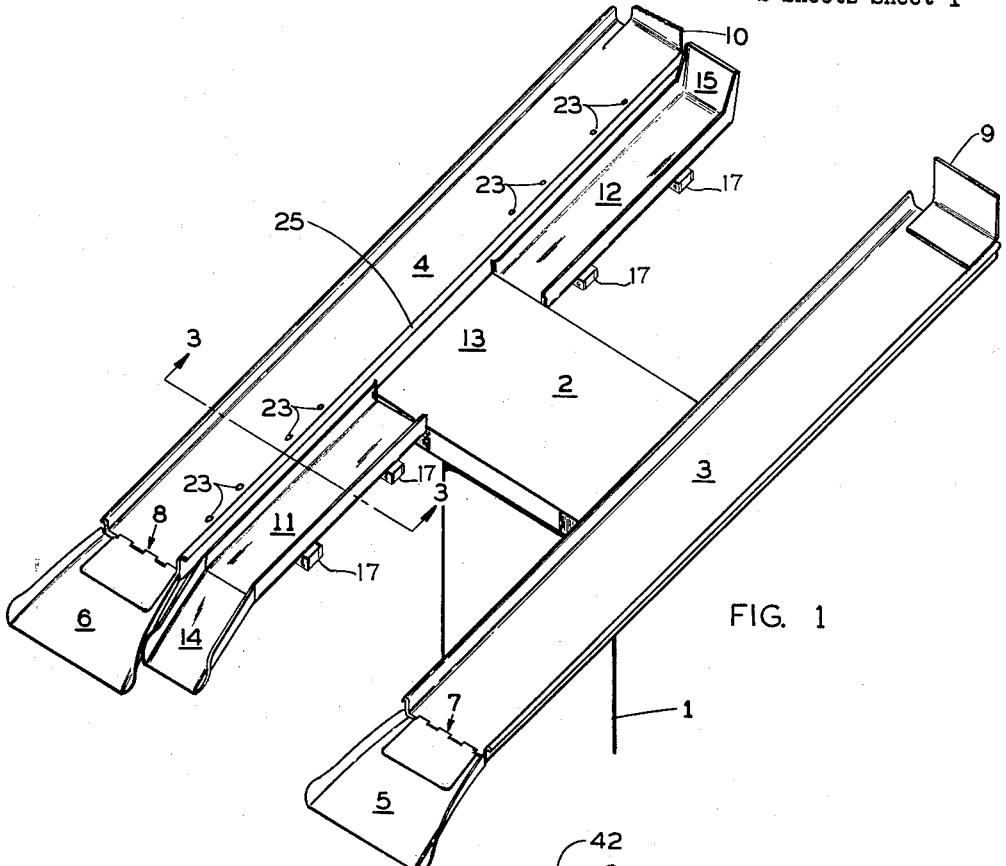

Sept. 25, 1962 W. P. DURST 3,055,454
LIFT TRACK
Filed July 7, 1960 2 Sheets-Sheet 1

*INVENTOR.*
*WILLIAM P. DURST*
BY Walter M. Rodgers
ATTORNEY

Sept. 25, 1962     W. P. DURST     3,055,454
LIFT TRACK
Filed July 7, 1960                                    2 Sheets-Sheet 2
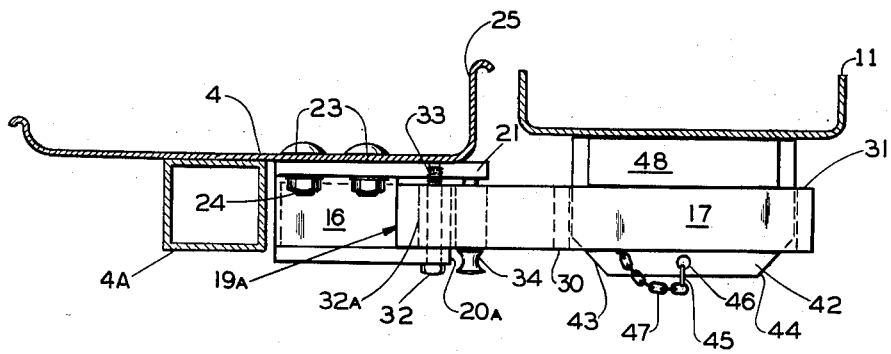
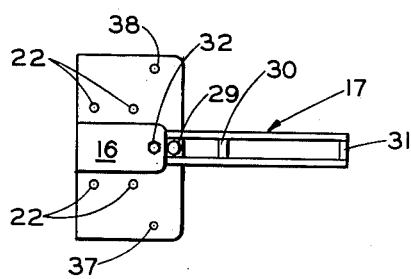
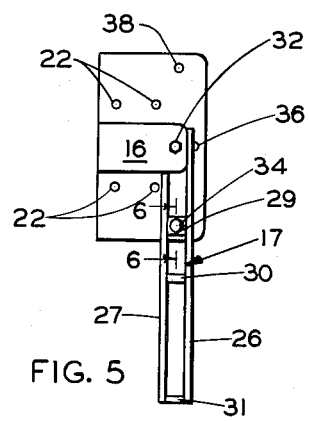
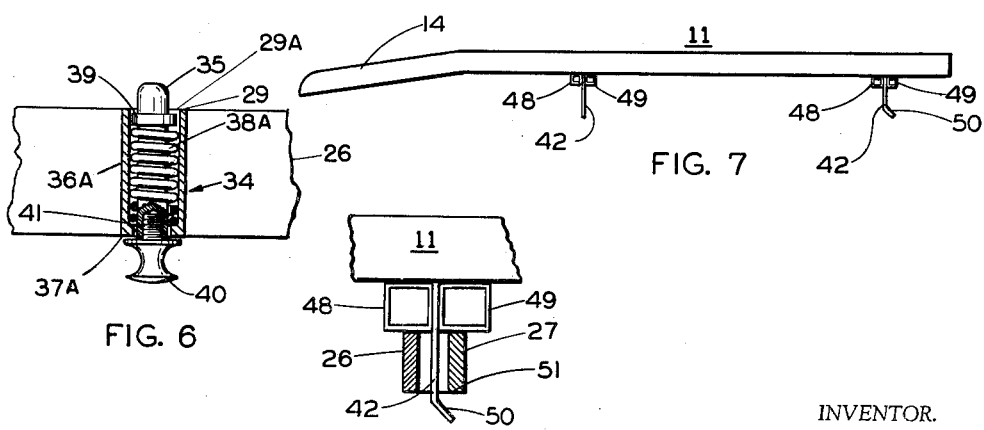
INVENTOR.
WILLIAM P. DURST
BY Walter M. Rodgers
ATTORNEY

3,055,454
LIFT TRACK
William P. Durst, 3680 Peachtree Road NE., Atlanta, Ga.
Filed July 7, 1960, Ser. No. 41,392
7 Claims. (Cl. 187—8.67)

This invention relates to lift tracks and more particularly to auxiliary lift tracks especially adapted for use in conjunction with vehicle lifts of the drive-on type commonly used in automobile service stations.

The recent increase in the use of automobiles and trucks which are constructed with a narrow wheel gauge has posed a problem for service station operators in that many of the drive-on type lifts currently used are not suitable for compact and sport cars because the tracks are too far apart. While narrow gauge lifts are available, cost and space considerations militate against their general use except in locations where only narrow gauge cars are serviced such, for example, as in the shops of sport cars dealers and the like.

According to one solution, a single auxiliary full length track is removably mounted by clamps along the inner edge of one of the main tracks of a standard gauge lift. While this approach adapts a standard gauge lift for use with narrow gauge vehicles, it has been found that the removable clamping devices do not afford a reliable and sturdy support for the auxiliary track resulting in a potentially hazardous condition. Furthermore mounting and dismounting of this type of auxiliary track requires the services of two attendants.

By another approach to the problem, an auxiliary track may be permanently affixed to a standard gauge lift. While this type of structure affords an adequate support for narrow gauge vehicles, the permanently installed auxiliary track constitutes an obstacle when the lift is used to service standard gauge vehicles because the auxiliary track prevents or substantially impedes access to parts requiring inspection or service.

A principal object of this invention is to provide an improved vehicle lift which is sturdy and durable and which is well-adapted for use with both standard gauge and narrow gauge vehicles and which affords free unobstructed access to all the vehicle parts requiring attention irrespective of whether the vehicle is of standard or narrow gauge construction.

Another object of the invention is to provide an auxiliary track for vehicle lifts of the drive-on type which is formed of two aligned auxiliary tracks and which is adapted for mounting and dismounting by a single attendant.

Still another object of the invention is the provision of an improved ruggedly constructed mounting bracket for removably supporting an auxiliary track on a vehicle lift.

A further object of the invention is to provide a safe vehicle lift which is readily and quickly converted from standard gauge to narrow gauge and vice versa.

A still further object of the invention is the provision of a lift which is readily convertible from one gauge to another while affording minimum risk that parts used in the conversion will be misplaced or lost.

The invention in one form comprises a pair of articulated mounting brackets each having a fixed support element permanently secured underneath one of the standard gauge tracks of a vehicle lift, a movable support element mounted on the fixed support element and arranged so that a load applied thereto is transmitted directly to the fixed support element, the movable support elements being movable from their service positions transverse to the main track to inactive positions underneath the main track, positioning means for securing each movable support element in its service or inactive positions and an auxiliary track adapted for removable mounting on the two movable support elements. Preferably each lift is provided with two auxiliary tracks arranged in line on either side of the bolster supporting the main tracks and of course a pair of mounting brackets as described are used in connection with each auxiliary track.

Figure 2:
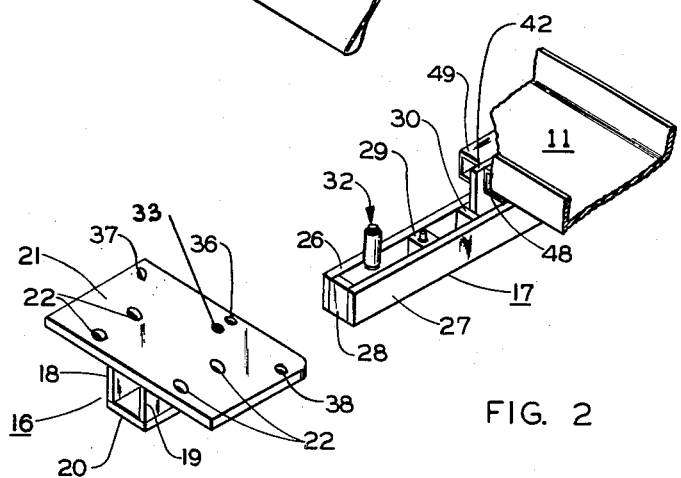

For a better understanding of the invention reference may be had to the following detailed description taken in conjunction with the accompanying drawings in which FIG. 1 is a perspective view of a standard gauge vehicle lift of the hydraulicly operated type to which an auxiliary track has been applied in accordance with the invention; FIG. 2 is an exploded perspective view showing the articulated mounting bracket constituting an essential feature of the invention; FIG. 3 is a cross-sectional view taken along the line 3—3 as indicated in FIG. 1; FIG. 4 is a view from underneath of the articulated mounting bracket depicted in FIGS. 2 and 3 and showing the parts in their normal service positions; FIG. 5 is a view similar to FIG. 4 but showing the mounting bracket in its inactive position; FIG. 6 is an enlarged view taken along line 6—6 in FIG. 5 of the positioning plunger by which the parts are held in either their service or inactive positions; FIG. 7 is a side view of an auxiliary channel which is provided with special holding means according to one facet of the invention; and in which FIG. 8 is an enlarged view of the right-hand end of FIG. 7 showing the cooperation between the channel and mounting bracket.

With reference to FIG. 1, the numeral 1 designates a vertically disposed cylindrical element which is hydraulically elevated and lowered to raise and lower the lift. Affixed atop the cylindrical element 1 is a conventional bolster 2. Affixed at either end of bolster 2 are main tracks 3 and 4. Main tracks 3 and 4 are respectively provided with entry chutes 5 and 6 which are hingedly connected at 7 and 8 respectively to the main channels 3 and 4. In like fashion the other ends of channels 3 and 4 are provided with fixed stops 9 and 10. A reinforcing strut is disposed underneath and secured to each track 3 and 4. Such a strut is indicated in FIG. 3 at 4A. It will be understood that the structure as described thus far is conventional and forms no part of the present invention.

According to this invention, auxiliary track members 11 and 12 are arranged together with the end portion 13 of bolster 2 to form an auxiliary track to accommodate a narrow gauge automobile, it being understood that main track 3 and auxiliary tracks 11, 12 and the end of bolster 13 would constitute the two tracks for the narrow gauge vehicle. Auxiliary channel 11 is provided with an entry ramp 14 while auxiliary channel 12 is provided with an upstanding stop 15.

For the purpose of mounting the auxiliary channels 11 and 12 to the main channel 4, a special articulated bracket is provided according to this invention. This mounting bracket is shown in perspective in FIG. 2 and in greater detail in FIGS. 3, 4 and 5. This mounting bracket comprises a fixed support element generally designated by the numeral 16 and a movable support element generally designated by the numeral 17.

Fixed support element 16 comprises a pair of spaced apart side walls 18 and 19 and a bottom wall 20. Side walls 18 and 19 are affixed to mounting plate 21 by any suitable means, such as by welding, while the bottom wall 20 is likewise secured to the opposite edges of side walls 18 and 19. If desired the fixed support element 16 could be a single casting and in practice is so constructed. Thus it will be understood that elements 18—21 of fixed support element 16 define a structure of rectangular cross-sectional configuration. Mounting plate 20 is preferably provided with four mounting holes designated in FIG. 2 by the numeral 22. Suitable bolts 23 extend through openings formed in main channel 4 and also extend through the openings 22 and are secured by suitable nuts 24. In FIG. 1 only two of the bolts 23 may be viewed due to the fact that the other two are obscured by the side wall 25 of main channel 4.

The movable support element 17 comprises a pair of struts 26 and 27 secured in parallel spaced relation by spacer blocks 28, 29, 30 and 31. The struts 26 and 27 are secured to the spacer blocks by welding or other suitable means. If desired the support element 17 could be a single casting and in practice is so constructed. From FIG. 2 it is apparent that the struts 26 and 27 and the spacer blocks define a structure which is of rectangular exterior configuration. The support element 17 is of such dimensions that the struts 26 and 27 and their spacer elements may be inserted telescopically within the structure comprising side walls 18 and 19, bottom wall 20 and mounting plate 21.

For the purpose of movably mounting the movable support element 17 telescopically relative to the fixed support element 16 and in order to provide an articulated relation there between, a swivel post 32 is provided. As can be seen best in FIGS. 3, 4 and 5, swivel post 32 is inserted through an opening provided in the right-hand end of bottom plate 20 and is threaded into a threaded opening 33 formed adjacent the right-hand edge of mounting plate 21. Furthermore, support element 17 is mounted with respect to swivel post 33 so that the post 33 occupies the space between the struts 26 and 27 and the spacer blocks 28 and 29 so as to establish a limited slidable relationship between support element 17 and fixed support element 16. Furthermore, from the description thus far it will be understood that a load applied on the movable support element 17 would be incapable of imparting relative movement to the movable support element 17 and fixed support element 16 due to the fact that the movable support element 17 telescopes well into the inner configuration of the structure defined by side walls 18 and 19, bottom wall 20 and mounting plate 21. For this reason the mechanical strength of the mounting bracket is substantial and therefore according to the invention a sturdy support for the auxiliary channels 11 and 12 is provided.

For the purpose of alternately securing the articulated parts 16 and 17 of the mounting bracket in their service and inactive positions, a positioning plunger generally designated by the numeral 34 is provided. Positioning plunger 34 is securely mounted within a drilled passage 29A in the spacer block 29 and the projecting tip 35 of plunger 34 is arranged to engage positioning opening 36 in order to hold the parts in their service positions depicted in FIG. 4, or to engage one of the positioning openings 37 or 38 in order to hold the support element 17 in one of its two inactive positions. It will be understood that the side walls 18 and 19 are shorter than the bottom wall 20, the end 19A of side wall 19 being indicated in FIG. 3. Because of the cutaway part of the side walls 18 and 19, the movable support element 17 may be swung about the swivel post 32 upon limited relative outward movement of movable support element 17 coaxially of fixed support element 16.

The positioning plunger 34 is shown in detail in FIG. 6 and comprises a tip 35, a shoulder portion 37a formed when passage 29A is drilled against which shoulder the lower end of compressional spring 38A bears. A rim portion 39 is formed on the plunger 35 and constitutes a purchase surface for the upper end of compression spring 38A. Finger gripping knob 40 is threaded into the plunger 35 as indicated at 41. Thus a downward pull on finger gripping knob 40 causes plunger 35 to move downwardly against the force of compressional spring 38A. When the upper end of plunger 35 moves downwardly and clears the upper end of hole 29A, the plunger is clear of its holding aperture such as 36, 37, or 38, and thereafter the movable support element 17 may be moved as desired. When the movable support element 17 occupies a desired position, it may be secured therein by releasing the plunger 35 into the inactive apertures 37 and 38 or the service aperture 36.

Once the movable support elements 17 are moved from their inactive to their service positions and secured there by positioning plungers 35, it is only necessary to mount the auxiliary channels in position. As thus shown in FIG. 3, auxiliary channel 11 is provided with a downwardly depending tongue 42 which is bevelled at its lower edge as indicated at 43 and 44. Of course channel 11 is provided with two horizontally spaced tongues 42 for cooperating with each of the two associated movable support elements 17. The tongues 42 are respectively inserted between the struts 26 and 27 and occupy the space between spacer blocks 30 and 31. Auxiliary channel 12 is similarly supported by a pair of brackets.

For the purpose of securing each tongue in its channel holding position, a locking pin 45 may be inserted into the locking aperture 46 formed in the lower part of the tongue. In order to secure the locking pin 45 in position and to avoid its inadvertent misplacement a chain 47 may be fastened to locking pin 45 and in turn to a part of the structure such, for example, as to the strut 27 of movable support element 17.

For the purpose of elevating the auxiliary channels 11 and 12 somewhat to the level of the left-hand end 13 of bolster 2, spacer blocks 48 and 49 may be provided. As is best shown in FIG. 2, these blocks 48 and 49 may simply comprise rectangularly shaped hollow tubular elements welded or otherwise secured on either side of locking tongue 42. As will be obvious, the spacer elements 48 and 49 simply rest on the upper edges of the struts 27 and 26 respectively.

If desired, the locking pin 45 may be eliminated for one of the locking tongues 42 on each channel 11 and 12 by using the configuration of the tongue depicted in FIGS. 7 and 8. As is shown in FIGS. 7 and 8, the lower end of locking tongue 42 may be bent outwardly toward the right to form a locking surface 50. From FIG. 8 it is apparent that an upward force imparted to channel 11 would cause the locking surface 50 of tongue 42 to abut the lower edge 51 of strut 27. Thus the auxiliary channel 11 is securely locked in position. In order to remove the auxiliary channel 11, the left-hand or entry end as indicated at 14 of channel 11 is first elevated. The locking surface 50 of locking tongue 42 is then disposed so as to clear the inner surfaces of struts 26 and 27 and the channel may then be moved in a vertical direction either to remove it or to place it in its service position.

While it might be desirable to provide holding means such as locking pin 45 for each of the two tongues 42 on each of the auxiliary channels 11 and 12, it generally is only necessary to use a locking means such as pin 45 or shoulder 50 on the forward tongue such as the tongue adjacent the bolster 13 on channel 11 and for the tongue adjacent the stop 15 on channel 12.

On the other hand if the brackets are mounted on the main track so as to be near the ends of channels 11 and 12 it is possible to dispense with locking means since the vehicle wheel will then be between the mounting brackets and will thus not tend to swing the channels 11 or 12 about the mounting brackets as a fulcrum.

While I have shown and described particular embodiments of the invention, I do not wish to be limited thereto and intend in the appended claims to cover all such changes and modifications as fall within the true spirit and scope of the invention.

What I claim as new and desire to secure by Letters Patent of the United States is:

1. An articulated mounting bracket comprising a pair of tubular support elements, a swivel post mounted on one of said elements adjacent an end part thereof, a slot formed in the other of said elements and arranged to receive said post in slidable relation, said elements normally being disposed in coaxial relation and being arranged so that a bending moment imparted to one of said elements in a direction generally parallel with the axis of said post is transmitted directly to the other of said elements without causing substantial relative angular movement therebetween, said support elements being relatively movable angularly in a plane generally normal to the axis of said post after predetermined relative coaxial movement in one direction from their normal positions, and positioning means for holding said support elements in a particular angular relationship.

2. An articulated mounting bracket comprising a fixed mounting plate, a fixed hollow support element of rectangular cross-section on said plate, a movable support element slidable within said fixed support element and arranged so that a bending moment imparted to said movable support element in one general direction transverse to its axis is transmitted directly to said fixed support element and plate without causing substantial relative angular movement therebetween, a swivel post on one of said support elements with its axis generally parallel to the one general direction of application of the bending moment, and a slot in the other support element for receiving said post in slidable relation, a part of said fixed support element on at least one side of said post being cut away to receive said movable support element upon relative angular movement therebetween in a plane generally normal to the axis of said post.

3. An articulated mounting bracket comprising a fixed mounting plate, a fixed hollow support element of rectangular cross-section mounted on said plate, a movable support element slidable within said fixed support element and arranged so that a bending moment imparted to said movable support element in one general direction transverse to its axis is transmitted directly to said fixed support element and plate without causing substantial relative angular movement therebetween, a swivel post on one of said support elements with its axis generally parallel to the one general direction of application of the bending moment, a slot in the other support element for receiving said post in slidable relation, a part of said fixed support element on at least one side of said post being cut away to receive said movable support element upon relative angular movement therebetween in a plane generally normal to the axis of said post, a positioning plunger on said movable support element, and a plurality of apertures formed in said mounting plate and arranged selectively to receive said plunger so as to hold said support elements in a desired angular relationship.

4. In combination, a pair of telescopically related support elements normally disposed in coaxial relation and arranged so that a bending moment imparted to one of said elements in one general direction transverse to its axis is transmitted directly to the other of said elements without causing substantial relative angular movement therebetween, said support elements being relatively movable angularly in a plane generally normal to the one general transverse direction upon predetermined relative axial movement from their normal positions relative to each other, positioning means for holding said support elements in a particular angular relationship, an elongated element removably mounted on said movable support element and exerting a force thereon in the one general direction, a locking slot formed in said movable support element, a locking tongue formed on said elongated element and adapted for insertion into said locking slot, and means preventing removal of said locking tongue from said locking slot.

5. In combination, a pair of telescopically related support elements normally disposed in coaxial relation and arranged so that a bending moment imparted to one of said elements in one general direction transverse to its axis is transmitted directly to the other of said elements without causing substantial relative angular movement therebetween, said support elements being relatively movable angularly in a plane generally normal to the one general transverse direction upon predetermined relative axial movement from their normal positions relative to each other, positioning means for holding said support elements in a particular angular relationship, an elongated element removably mounted on said movable support element, a locking slot formed in said movable support element and exerting a force thereon in the one general direction, and in a locking tongue formed on said elongated element and adapted for inserting into said locking slot, said locking tongue being configured so that said tongue can be inserted into said slot with said elongated element disposed at a predetermined angle relative to said slot and so that said tongue cannot be removed from said locking slot when said elongated element occupies its normal position relative to said movable support element.

6. Auxiliary track means adapted for mounting alongside a main track of a vehicle lifting device, said auxiliary track means comprising a pair of support elements adapted for permanent fixed mounting on the main track in longitudinally spaced relation, a pair of movable support elements respectively mounted on said fixed support elements in horizontally coaxially slidable relation, said movable support elements being effective to transmit the force due to a weight carried by said movable support elements directly to said fixed support elements, a vertically disposed swivel post secured to each of said support elements, a slot formed in the other of said support elements for slidably receiving said post to form an articulated connection therebetween whereby said movable support elements may extend laterally from the main track to form supports for the auxiliary track and may be swung about their associated swivel posts to positions adjacent and generally parallel to the main track, positioning means associated with each of said movable support elements and arranged selectively to hold its associated support means in its transverse or parallel positions relative to the main track, an auxiliary track arranged for removable mounting on said movable support elements, and means defining a disjointable connection between said track and each of said movable support elements.

7. Auxiliary track means adapted for mounting alongside a main track of a vehicle lifting device, said auxiliary track means comprising a pair of support elements adapted for permanent fixed mounting on the main track in longitudinally spaced relation, a pair of movable support elements respectively mounted on said fixed support elements in horizontally coaxially slidable relation, said movable support elements being effective to transmit the force due to a weight carried by said movable support elements directly to said fixed support elements, a vertically disposed swivel post secured to each of said support elements, a slot formed in the other of said support elements for slidably receiving said post to form an articulated connection therebetween whereby said movable support elements may extend laterally from the main track to form supports for the auxiliary track and may be swung about their associated swivel posts to positions adjacent and generally parallel to the main track, positioning means associated with each of said movable support elements and arranged selectively to hold its associated support means in its transverse or parallel positions relative to the main track, an auxiliary track arranged for removable mounting on said movable support elements, and means defining a disjointable connection between said track and each of said movable support elements, the disjointable connection between said auxiliary track and one of said movable support elements being effective to prevent predetermined relative movement between said auxiliary track when said track occupies its normal service position relative to said one movable support element being ineffective to prevent such relative movement when the disjointable connection between said auxiliary track and the other of said movable support elements is released and said auxiliary track is then moved to an angular position relative to the main track.

References Cited in the file of this patent

UNITED STATES PATENTS

| | | |
|---|---|---|
| 413,131 | Chappell | Oct. 15, 1889 |
| 1,596,075 | Buswell | Aug. 17, 1926 |
| 1,926,368 | Bristol | Sept. 12, 1933 |
| 2,602,633 | Reedy | July 8, 1952 |
| 2,717,802 | Martin | Sept. 13, 1955 |
| 2,769,508 | Pelouch | Nov. 6, 1956 |
| 2,956,645 | Halstead | Oct. 18, 1960 |
| 3,007,546 | Bell et al. | Nov. 7, 1961 |
| 3,008,545 | Williams | Nov. 14, 1961 |